(12) United States Patent
Rosenzweig et al.

(10) Patent No.: US 11,892,413 B2
(45) Date of Patent: Feb. 6, 2024

(54) SYSTEM AND METHOD FOR CHARACTERIZING GEMSTONES USING FLUORESCENCE

(71) Applicant: SARINE TECHNOLOGIES LTD., Hod Hasharon (IL)

(72) Inventors: Tal Rosenzweig, Rehovot (IL); Arie Zeev Shapira, Tzufim (IL); Abraham M. Kerner, Herzliya (IL)

(73) Assignee: SARINE TECHNOLOGIES LTD., Hod Hasharon (IL)

( * ) Notice: Subject to any disclaimer, the term of this patent is extended or adjusted under 35 U.S.C. 154(b) by 84 days.

(21) Appl. No.: 17/588,384

(22) Filed: Jan. 31, 2022

(65) Prior Publication Data
US 2022/0244189 A1 Aug. 4, 2022

Related U.S. Application Data

(60) Provisional application No. 63/144,570, filed on Feb. 2, 2021, provisional application No. 63/143,992, filed on Feb. 1, 2021.

(51) Int. Cl.
| | | |
|---|---|---|
| *G01N 21/64* | (2006.01) | |
| *G01N 21/87* | (2006.01) | |
| *G01N 21/17* | (2006.01) | |

(52) U.S. Cl.
CPC ............ *G01N 21/87* (2013.01); *G01N 21/17* (2013.01); *G01N 21/64* (2013.01); *G01N 2021/174* (2013.01); *G01N 2021/6423* (2013.01)

(58) Field of Classification Search
CPC ........ G01N 21/87; G01N 21/17; G01N 21/64; G01N 2021/174; G01N 2021/6423; G01N 21/6489
See application file for complete search history.

(56) References Cited

U.S. PATENT DOCUMENTS 5,206,699 A * 4/1993 Stewart ................... G01S 7/497
  209/579
7,652,755 B2 1/2010 Liu
(Continued)

FOREIGN PATENT DOCUMENTS

GB 2215041 9/1989

OTHER PUBLICATIONS

Sally Eaton-Magana et al., "Fluorescence Spectra of Colored Diamonds Using a Rapid, Mobile Spectrometer", Gems and Gemology, vol. 43, No. 4, Jan. 1, 2007, pp. 332-351.
(Continued)

*Primary Examiner* — Abdullahi Nur
(74) *Attorney, Agent, or Firm* — ISUS INTELLECTUAL PROPERTY PLLC; Anthony Jason Mirabito

(57) ABSTRACT

Systems and methods for determining properties of gemstones based, inter alia, on fluorescence properties of the gemstones, are presented. In one aspect, properties of at least one gemstone can be determined. In another aspect, a relationship between at least two gemstones can be determined. In one example, a first and a second gemstones are illuminated with illuminating light of at least one fluorescence-exciting wavelength range; corresponding at least one first fluorescence-emission light and at least one second fluorescence-emission light spectrum, emitted from the first and second gemstones respectively are detected and analyzed, either independently or by comparison, to determine the relationship between the first and second gemstones. In some examples, data indicative of visible light absorbance or three-dimensional models of the gemstones is combined with the fluorescence data to determine the properties or the relationship.

17 Claims, 12 Drawing Sheets

(56) References Cited

U.S. PATENT DOCUMENTS

| | | | |
|---|---|---|---|
| 9,176,068 B1* | 11/2015 | Radomyshelsky ... | G01J 3/2803 |
| 9,551,658 B2* | 1/2017 | Hell ...................... | G02B 21/16 |
| 10,107,757 B2 | 10/2018 | Takahashi | |
| 10,684,230 B2 | 6/2020 | Wang et al. | |
| 2004/0072137 A1* | 4/2004 | Lapa ........................ | G09B 5/02 |
| | | | 434/386 |
| 2005/0037615 A1* | 2/2005 | Cabib .................... | G01N 21/65 |
| | | | 438/689 |
| 2010/0151474 A1* | 6/2010 | Afanasyev ......... | G01N 21/6452 |
| | | | 435/6.13 |
| 2019/0219513 A1* | 7/2019 | Blank ................ | G02B 27/0955 |
| 2021/0389247 A1* | 12/2021 | Tsai ..................... | G02B 27/145 |

OTHER PUBLICATIONS

Search Report and Written Opinion—corresponding PCT Application No. PCTIB2022050819, dated Apr. 4, 2022, 13 pages.

\* cited by examiner

16

Analyze the first and second fluorescence-emission spectrums independently to generate first and second fluorescence- signatures, and utilize the first and second fluorescence-signatures to determine the relationship between the first and second gemstone samples —16A Analyze the first and second fluorescence-emission spectrums by comparing there between to generate fluorescence comparison identifiers, and utilize the comparison identifiers to determine the relationship between the first and second gemstone samples —16B Build a database of fluorescence-signatures and/or fluorescence comparison identifiers, and compare the analysis results of step 16A and/or 16B to the database to determine the relationship between the first and second gemstone samples —16C Use Artificial Intelligence (e.g., machine learning and/or deep learning) to determine fluorescence signatures and/or comparison identifiers and determine the relationship between the first and second gemstone samples —16D

FIG. 1B

SYSTEM AND METHOD FOR CHARACTERIZING GEMSTONES USING FLUORESCENCE

RELATED APPLICATIONS

This application is related to and claims priority to U.S. Provisional Application 63/143,992, filed Feb. 1, 2021, as well as U.S. Provisional Application 63/144,570, filed Feb. 2, 2021, both of which applications are herein incorporated in their entireties.

TECHNOLOGICAL FIELD

The present invention is in the gemstone industry field and relates specifically to systems and methods for exciting and measuring fluorescence in gemstones, specifically diamonds, and for tracing the identity of such gemstones.

BACKGROUND

A gemstone or a diamond undergoes a long path between the mine (or laboratory for lab grown diamonds) where it originated, until it is eventually bought by an end user customer. It starts as a rough stone that is parted, cut into shape and polished. As customers are becoming more knowledgeable about the different processing stages, and in view of the wealth of information accessible to them, they are more and more interested in acquiring the history of a diamond that they intend to buy. Specifically, customers are becoming more interested in verifiable proof that the diamond they are going to purchase was produced ethically.

Tracing a diamond along and through the manufacturing process is challenging since a rough stone's form and characteristics are changed throughout the process (by being divided (parted), polished, etc.) and information gathered at an early stage may be lost down the road and/or it can be difficult to identify a polished stone's origin due to identifying features being changed or entirely removed during polishing. One of the techniques to validate that the rough, parted diamond is the same stone that was retrieved from the mine is three-dimensional modelling. Also, three-dimensional modelling can be used to investigate the identity of some polished stones, as well as help to verify that they likely have been produced from a specific parted rough diamond.

Inclusions detected in scans of the rough diamond can be compared to those found in scans of the polished diamond, enabling the tying of the rough diamond to its polished product. This is valid for stones with a clarity of VS1 or lower.

SUMMARY

The presently disclosed subject matter provides methods and systems for determining relationships between gemstones, particularly diamonds. One of the main relationships of interest between gemstones is tracing the final polished product to its original rough or parted gemstone. It is noted that while in the description below, the emphasis is put on diamonds, this should not be interpreted as limiting the presently disclosed subject matter which can be applied to other fluorescent gemstones. For some diamonds, e.g. those with a clarity of VVS or higher, it is difficult to link the rough or parted diamond to the final polished product, inter alia due to lack of unique identifiers such as inclusions or of three-dimensional features that are lost by the polishing process.

Diamonds are fluorescent when excited with specific light wavelengths. Fluorescence of diamonds is intrinsic to a specifically examined diamond, it cannot be manipulated and it is not generally changed by the polishing process. Although, in some cases, a major fluorescent area or color center can be polished out of the stone, however, additional fluorescence or color is not introduced by the polishing process. This makes fluorescence of diamonds a very useful property for traceability of a specific diamond by proving or disproving the provenance of a polished diamond to a particular rough precursor.

Fluorescence of diamonds can be excited by shining a number of different wavelengths of light on the diamond. This action induces different emission spectra for each excitation wavelength. In some cases, a single excitation wavelength may be enough to determine a relationship between two or more diamonds. On the other hand, by providing additional spectral information, a more unique fluorescence signature of the diamond can be generated which helps to determine a relationship between two stones even more easily.

Thus, according to one aspect of the presently disclosed subject matter, there is provided a method for determining a relationship between at least two gemstone samples, the method comprising:
  illuminating a first gemstone sample with illuminating light of at least one fluorescence-exciting wavelength range;
  detecting and recording a corresponding at least one first fluorescence-emission light spectrum emitted from the first gemstone sample;
  illuminating a second gemstone sample with the illuminating light of the at least one fluorescence-exciting wavelength range;
  detecting and recording a corresponding at least one second fluorescence-emission light spectrum emitted from the second gemstone sample;
  analyzing the at least one first fluorescence-emission spectrum and at least one second fluorescence-emission spectrum; and
  determining a relationship between the first and second gemstone samples.

In some embodiments, said analyzing of the at least one first fluorescence-emission spectrum and at least one second fluorescence-emission spectrum comprises at least one of the following:
  independently analyzing the first and second fluorescence-emission spectrums and respectively generating first and second fluorescence-signatures, then utilizing the first and second fluorescence-signatures to determine the relationship between the first and second gemstone samples;
  applying a direct comparison between the first and second fluorescence-emission spectrums and generating fluorescence comparison identifiers, then utilizing the comparison identifiers to determine the relationship between the first and second gemstone samples.

In some embodiments, the method further comprises at least one of the following:
  building a database of fluorescence-signatures and/or fluorescence comparison identifiers, then comparing the analysis results of the first and/or second gemstone samples to the database in order to determine the relationship between the first and second gemstone samples;

utilizing Artificial Intelligence methods to generate fluorescence signatures and/or comparison identifiers for the first and/or second gemstone samples and determine the relationship between the first and second gemstone samples; and utilizing Artificial Intelligence methods to determine the relationship between the first and second gemstone samples based on the comparison identifiers.

In some embodiments, said illuminating light of at least one fluorescence-exciting wavelength range comprises at least one of the following: UVA range, UVB range and UVC range.

In some embodiments, said illuminating light of at least one fluorescence-exciting wavelength range comprises at least one of the following wavelengths: 365 nm, 310 nm and 265 nm.

In some embodiments, the method further comprises:

illuminating through the first and second gemstone samples with visible white light;

detecting and recording corresponding at least one absorbance light spectrum of each of the first and second gemstone samples; and analyzing the absorbance light spectrums to determine the relationship between the first and second gemstone samples.

In some embodiments, the method further comprises:

imaging the first and second gemstone samples;

acquiring respective images of the first and second gemstone samples, the images being indicative of at least one of the following: fluorescence zones within the first and second gemstone samples, and three-dimensional models of the first and second gemstone samples; and analyzing the images to determine the relationship between the first and second gemstone samples.

In some embodiments, said determining the relationship between the first and second gemstone samples results in one of the following:

determining that the first and second gemstone samples are the same gemstone in rough and polished states;

determining that the first and second gemstone samples are two different gemstones in same rough, parted or polished state;

determining that the first and second gemstone samples are two different gemstones in respectively two different states among the following: rough, parted and polished states.

According to another aspect of the presently disclosed subject matter, there is provided a system for determining a relationship between first and second gemstone samples, the system comprising:

a light source system comprising one or more light sources configured and operable to generate at least one illumination light in desired one or more wavelengths and intensities that excite at least one fluorescence reaction in the first and second gemstone samples;

a holding stage configured to hold at least one of the first and second gemstone samples in illumination zone(s) covered by the at least one illumination light;

a spectrometer located in a detection zone and configured and operable to detect at least one emission light emitted by each of the first and second gemstone samples and record corresponding at least one fluorescence-emission spectrum for each of the first and second gemstone samples; and a controller and analyzing system configured and operable to control the light source system, the holding stage, and the spectrometer, and analyze the at least one fluorescence-emission spectrum for each of the first and second gemstone samples, and determine a relationship between first and second gemstone samples.

In some embodiments, said controller and analyzing system comprises at least one of the following modules:

a fluorescence-signature extractor module configured and operable to individually analyze the fluorescence-emission spectrum(s) received from each of the first and second gemstone samples and generate fluorescence-signatures respectively, then utilize the fluorescence-signatures to determine the relationship between the gemstone samples; and a fluorescence-comparison identifier extractor module configured and operable to apply a direct comparison between the fluorescence-emission spectrums that respectively belong to the first and second gemstone samples, and generate fluorescence comparison identifiers, then utilize the fluorescence comparison identifiers to determine the relationship between the first and second gemstone samples.

In some embodiments, said light source system is configured and operable to generate the illuminating light of at least one fluorescence-exciting wavelength range in at least one of the following: UVA range, UVB range and UVC range.

In some embodiments, said light source system is configured and operable to generate the illuminating light of at least one fluorescence-exciting wavelength range in at least one of the following wavelengths: 365 nm, 310 nm and 265 nm.

In some embodiments, the system further comprises a visible white light source configured and operable to illuminate through the first and second gemstone samples with visible white light; the spectrometer being configured and operable to record corresponding at least one absorbance spectrum for each of the first and second gemstone samples, the controller and analyzer system comprising at least one of the following modules:

an absorbance-signature extractor module configured and operable to individually analyze the absorbance spectrums for the first and second gemstone samples and generate respective absorbance-signatures, then utilize the absorbance-signatures to determine the relationship between the first and second gemstone samples; and an absorbance-comparison identifier extractor module configured and operable to apply a direct comparison between the absorbance spectrums that respectively belong to the first and second gemstone samples and generate absorbance comparison identifiers, then utilize the absorbance comparison identifiers to determine the relationship between the first and second gemstone samples.

In some embodiments, the system further comprises an imaging system configured and operable to acquire images of the first and second gemstone samples, the controller and analyzing system being configured and operable to process the images and comprising at least one of the following:

a three-dimensional (3D) model builder module configured and operable to generate 3D models of the first and second gemstone samples respectively, then utilize the 3D models to determine the relationship between the first and second gemstone samples;

a fluorescence zone(s) identifier module configured and operable to detect fluorescence zone(s) in the first and second gemstone samples, while being illuminated with the at least one illumination light, and generate respective first and second fluorescence zone(s) map, then utilize the fluorescence zone(s) maps to determine the relationship between the first and second gemstone samples.

In some embodiments, said controller and analyzing system is configured and operable to determine the relationship between the first and second gemstone samples by determining one of the following:
  that the first and second gemstone samples are the same gemstone in rough, parted, or polished states;
  that the first and second gemstone samples are two different gemstones in same rough, parted or polished state;
  that the first and second gemstone samples are two different gemstones in respectively two different states among the following: rough, parted and polished states.

In some embodiments, the system further comprises an excitation light directing system configured and operable to direct the at least one illumination light between the light source system and the first and second gemstone samples located in the illumination zone; wherein the excitation light directing system comprises an optical fiber directly coupled to each one of the one or more light sources.

In some embodiments, the system further comprises a light collecting system configured and operable to collect and direct the at least one emission light between the gemstone sample and the spectrometer; wherein the light collecting system comprises an optical fiber directly coupled to the spectrometer.

According to yet another aspect of the presently disclosed subject matter, there is provided a system for determining properties of at least one gemstone sample, the system comprising:
  a light source system comprising one or more light sources configured and operable to generate illumination light in desired one or more wavelengths and intensities that excite at least one fluorescence reaction in the gemstone sample;
  a holding stage configured to hold the at least one gemstone sample in an illumination zone covered by the illumination light;
  a spectrometer located in a detection zone and configured and operable to detect at least one emission light emitted by the at least one gemstone sample and record corresponding at least one fluorescence-emission spectrum;
  at least one of the following:
  a visible white light source configured and operable to illuminate through the gemstone sample with visible white light; the spectrometer being configured and operable to record corresponding at least one absorbance spectrum for the gemstone sample,
  an imaging system configured and operable to acquire images of the gemstone sample;
and
  a controller and analyzing system configured and operable to control the light source system, the holding stage, and the spectrometer, and analyze at least two of the following: the at least one fluorescence-emission spectrum, and at least one of the at least one absorbance spectrum and the images, to determine the properties of the gemstone sample.

In some embodiments, when the system comprises the visible white light source, said controller and analyzing system comprises the following modules:

a fluorescence-signature extractor module configured and operable to analyze the at least one fluorescence-emission spectrum and generate at least one fluorescence-signature, then utilize the at least one fluorescence-signature to determine the properties of the gemstone sample; and
  an absorbance-signature extractor module configured and operable to analyze the at least one absorbance spectrum and generate at least one absorbance-signature, then utilize the at least absorbance-signature to determine the properties of the gemstone sample.

In some embodiments, when the system comprises the imaging system, said controller and analyzing system comprises the following modules:
  a fluorescence-signature extractor module configured and operable to analyze the at least one fluorescence-emission spectrum and generate at least one fluorescence-signature, then utilize the at least one fluorescence-signature to determine the properties of the gemstone sample;
  a three-dimensional (3D) model builder module configured and operable to generate a 3D model of the gemstone sample, then utilize the 3D model to determine the properties of the gemstone sample; and
  a fluorescence zone identifier module configured and operable to detect fluorescence zone(s) in the gemstone sample, while being illuminated with the at least one illumination light, and generate a fluorescence zone(s) map, then utilize the fluorescence zone(s) map to determine the properties of the gemstone sample.

According to yet another aspect of the presently disclosed subject matter, there is provided a system for determining properties of at least one gemstone sample, the system comprising:
  a light source system comprising one or more light sources configured and operable to generate illumination light in desired one or more wavelengths and intensities that excite at least one fluorescence reaction in the gemstone sample located in an illumination zone;
  a spectrometer located in a detection zone and configured and operable to detect at least one emission light emitted by the at least one gemstone sample and record corresponding at least one fluorescence-emission spectrum;
  an imaging system configured and operable to acquire images of the gemstone sample at least while being illuminated with said illumination light; and
  a controller and analyzing system configured and operable to:
  control the light source system, the spectrometer, and the imaging system, and
  analyze the at least one fluorescence-emission spectrum and the images to generate a 3D model of the gemstone sample, identify fluorescence zone(s) in the gemstone sample and generate a fluorescence zone(s) map indicative thereof, then utilize the 3D model and fluorescence zone(s) map to determine the properties of the gemstone sample.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1B illustrates a non-limiting exemplary embodiment of analysis steps for determining a relationship between gemstones according to the presently disclosed subject matter;

DETAILED DESCRIPTION

Figure 1A:
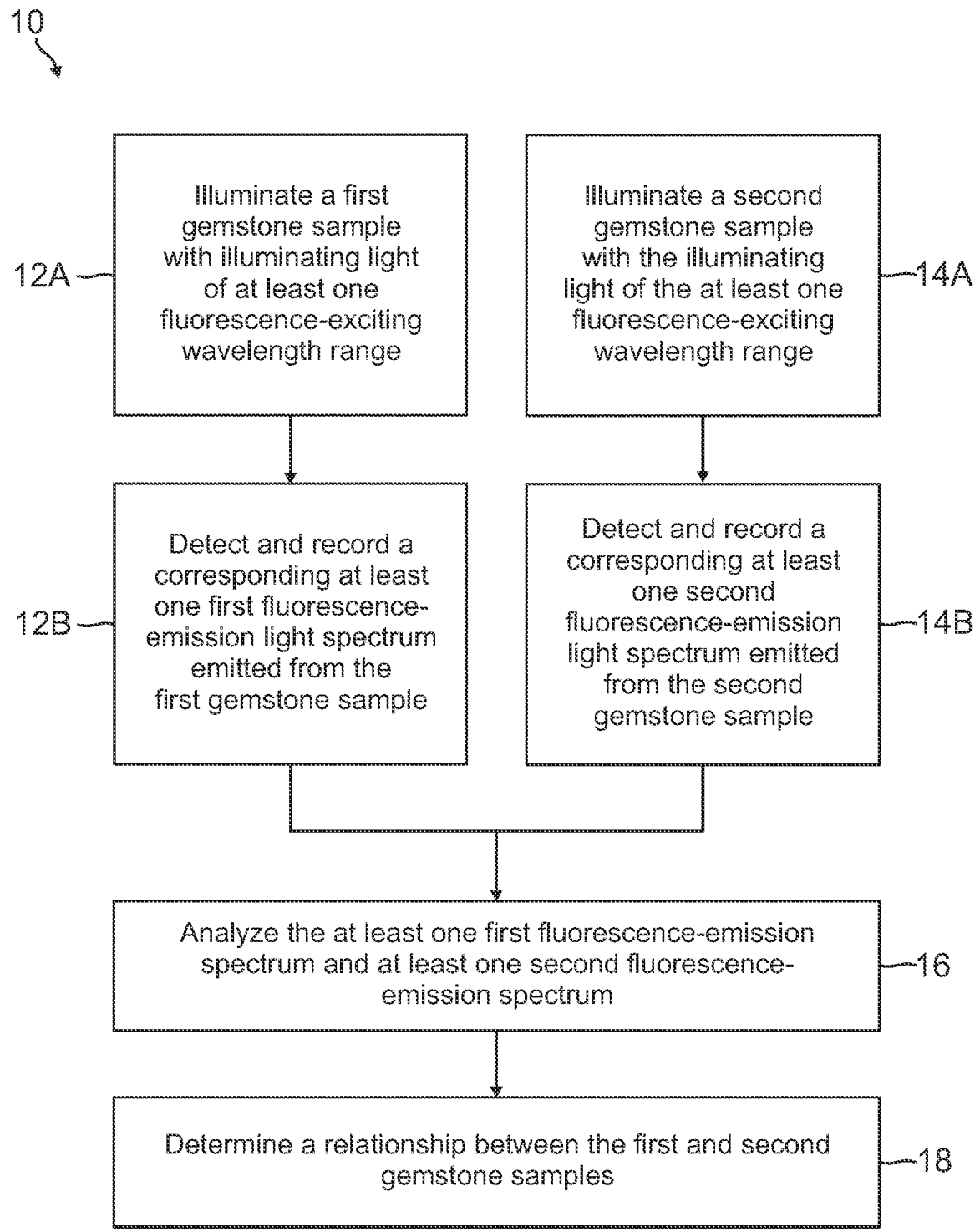
FIG. 1A illustrates a non-limiting exemplary embodiment of a method for determining a relationship between gemstones according to the presently disclosed subject matter.

Reference is made to FIG. 1A illustrating, by way of a flow diagram, a non-limiting example of a method 10 for determining a relationship/comparison between two gemstone samples, in accordance with the presently disclosed subject matter.

As shown in the figure, in a step 12A, the method includes illuminating a first gemstone sample with illuminating light of at least one fluorescence-exciting wavelength range.

The first gemstone sample can be in one of a variety of stone states. In some embodiments, the first gemstone sample can be in a rough state, the state of the gemstone as acquired from a mine, or as grown, in the case of a laboratory manufactured gemstone. In some embodiments, the first gemstone sample can be in a parted state, that is, obtained by parting a rough stone. In some embodiments, the first gemstone sample can be in a polished state that is obtained by polishing a rough or parted stone. The first gemstone sample in any of the above-mentioned states can be a complete gemstone or one or more portions of the complete gemstone.

The illuminating light of the at least one fluorescence-exciting wavelength range is configured and operable to induce a fluorescence reaction in the first gemstone sample. In some embodiments, the illuminating light includes two or more fluorescence-exciting wavelength ranges being activated sequentially. In some embodiments, the illuminating light include two or more fluorescence-exciting wavelength ranges being activated, at least partially, simultaneously or even sequentially.

In some embodiments, the wavelength range is a specific, predetermined, value of a light wavelength.

In some embodiments, the illuminating light of the at least one fluorescence-exciting wavelength range is within the Ultra-Violet (UV) wavelength range. In some embodiments, the illuminating light of the at least one fluorescence-exciting wavelength range include one or more of the following wavelength ranges: UVA, UVB and UVC. In some embodiments, the illuminating light of the at least one fluorescence-exciting wavelength range has a wavelength of one or more of the following wavelength values: 365 nm, 310 nm and/or 265 nm.

In a step 12B, following step 12A, the method includes detecting and recording a corresponding at least one first fluorescence-emission light spectrum emitted from the first gemstone sample. When the illuminating light of the at least one fluorescence-exciting wavelength range includes more than one wavelength value or range, being projected sequentially towards the first gemstone sample, corresponding fluorescence-emission light spectrums are detected and recorded. In case the illuminating light of the at least one fluorescence-exciting wavelength range includes more than one wavelength value or range, being projected simultaneously towards the first gemstone sample, the spectra of the fluorescence-emission light, including emissions induced by all fluorescence-exciting wavelength ranges or values is detected and recorded.

In a step 14A, the method includes illuminating a second gemstone sample with the illuminating light, of the at least one fluorescence-exciting wavelength range, that was used in step 12A above.

Like the first gemstone sample, the second gemstone sample can be in one of a variety of stone states. In some embodiments, the second gemstone sample can be in a rough state as acquired from a mine, or as grown, in the case of a laboratory manufactured gemstone. In some embodiments, the second gemstone sample can be in a parted state that is obtained by parting a rough stone. In some embodiments, the second gemstone sample can be in a polished state that is obtained by polishing a rough or parted stone. The second gemstone sample in any of the above-mentioned states can be a complete gemstone or one or more portions of the complete gemstone.

In some embodiments, the first and second gemstone samples belong to two different gemstones of identical states, e.g. two different gemstones in rough states, in parted states or in polishes states. In some embodiments, the first and second gemstone samples belong to the same gemstone of different states, e.g. a gemstone in rough and polished states, or a gemstone in parted and polished states.

The illuminating light of the at least one fluorescence-exciting wavelength range is configured and operable to induce a fluorescence reaction in the second gemstone sample. All of the other specifications of the illuminating light of the at least one fluorescence-exciting wavelength range described above as to the first gemstone sample are also valid with respect to the second gemstone sample.

In a step 14B, following step 14A, the method includes detecting and recording a corresponding at least one second fluorescence-emission light spectrum emitted from the second gemstone sample. As described above, when the illuminating light of the at least one fluorescence-exciting wavelength range includes more than one wavelength value or range, being projected sequentially towards the second gemstone sample, corresponding fluorescence-emission light spectrums are detected and recorded. In case the illuminating light of the at least one fluorescence-exciting wavelength range includes more than one wavelength value or range, being projected simultaneously towards the second gemstone sample, the spectra of the fluorescence-emission light, including emissions induced by all fluorescence-exciting wavelength ranges or values is detected and recorded.

The illumination steps 12A and 14A, and the corresponding detection steps 12B and 14B, can be performed on one or more specific portions/regions of the first and second gemstone samples, from one or more angles, or they can be performed on the whole first and second gemstone samples, from angles covering the gemstone samples completely. In this case, the different steps include rotating the gemstone samples in different orientations that match the desired portions/regions to be illuminated and the fluorescence emissions to be detected.

It is appreciated that, steps 12A and 12B are timely connected and so are steps 14A and 14B. However, steps 12A and 12B can be performed prior to, in parallel to, or after steps 14A and 14B. In some embodiments, a plurality of gemstone samples can be illuminated and their emissions detected simultaneously or sequentially. It is also noted that, while the method is described with respect to two gemstone samples, it is well appreciated that the illumination and emission detection steps can be performed on more than two gemstone samples, either sequentially or simultaneously.

In a step 16, after performing the illumination and emission detection steps for all gemstones under test, the method includes analyzing the fluorescence-emission spectrums detected. In the described example, the method includes analyzing the at least one first fluorescence-emission spectrum, originating from the first gemstone sample, and at least one second fluorescence-emission spectrum, originating from the second gemstone sample, to determine, in a step 18, a relationship between the first and second gemstone samples.

In some embodiments, the analysis of the at least one first and second fluorescence-emission spectrums determines the relationship between the first and second gemstone samples being the same gemstone in rough and polished states. In some embodiments, the analysis of the at least one first and second fluorescence-emission spectrums determines the relationship between the first and second gemstone samples being two different gemstones in same rough, parted or polished state. In some embodiments, the analysis of the at least one first and second fluorescence-emission spectrums determines the relationship between the first and second gemstone samples being two different gemstones in two different states, e.g. rough and polished states or parted and polished states.

In some embodiments, the analysis includes normalizing the at least one first and second fluorescence-emission spectrums in order to mitigate or cancel intensity differences that can be present between rough and polished states of the same gemstone. As appreciated, normalizing, being a known technique, means that each of the values in each spectrum is divided by the maximal value of the spectrum, or by the value at a predetermined wavelength, such that the maximal or predetermined value equals 1 and the rest of values are fractions of this value.

Reference is now made to FIG. 1B, illustrating, by way of a block diagram, non-limiting examples of the analysis applied in step 16 of FIG. 1A on the at least one first and second fluorescence-emission spectrums. In some embodiments, the analysis includes one of the described analysis steps. In some embodiments, the analysis includes a plurality of the described analysis steps.

In step 16A, the analysis includes independently analyzing the first and second fluorescence-emission spectrums and respectively generating first and second fluorescence-signatures, then utilizing the first and second fluorescence-signatures, e.g. by comparing therebetween, to determine the relationship between the first and second gemstone samples.

In some embodiments, this step of analysis can be useful to determine that the first and second gemstone samples belong to different origins, i.e. not belonging to same gemstone along the manufacturing process.

In step 16B, which can be applied in addition to or as an alternative to step 16A, the analysis includes applying a direct comparison between the first and second fluorescence-emission spectrums and generating fluorescence comparison identifiers, then utilizing the comparison identifiers to determine the relationship between the first and second gemstone samples. In some embodiments, this step of analysis can be useful to determine that the first and second gemstone samples belong to the same originally acquired gemstone (traceability). The comparison between the spectrums can include any of the known mathematical operations, or a combination thereof, being used for this kind of spectral analysis, such as maximum, minimum, difference, threshold difference and so on.

In step 16C, the analysis results of steps 16A and 16B can be used to build a database of fluorescence-signatures and/or fluorescence comparison identifiers, then comparing the analysis results of gemstone samples under test to the database in order to determine the relationship, if any, between the first and second gemstone samples under test.

In step 16D, Artificial Intelligence (e.g., machine learning and/or deep learning) methods can be used on the gemstone samples under test to determine fluorescence signatures and/or comparison identifiers and determine the relationship between the first and second gemstone samples under test. The use of AI methods carries with it particular advantages, namely that it not only allows optimization of correlation functions based on predetermined parameters, but can also be used to identify new criteria for the comparison of the two spectrums. Yet further, AI can be used during the relationship determination step (e.g. step 18) to find and determine one or more optimal correlation functions for identifying gemstones, using signatures/comparison identifiers as inputs to the AI model.

As mentioned above, a plurality of steps of FIG. 1B can be implemented on each first and second gemstone samples under test.

Figure 2:
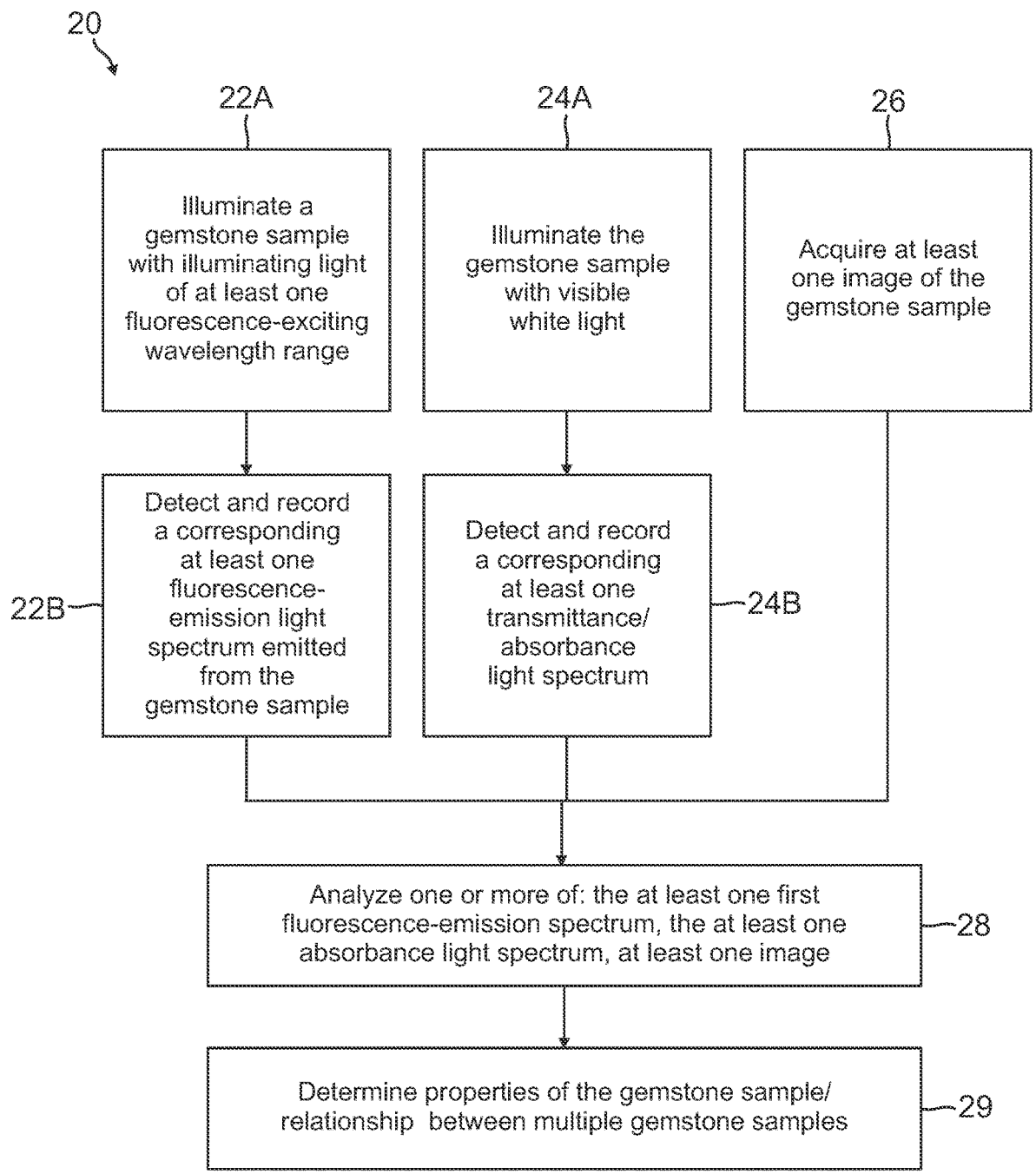
FIG. 2 illustrates a non-limiting exemplary embodiment of method for determining properties of a gemstone sample and/or a relationship between gemstones according to the presently disclosed subject matter.

Reference is now made to FIG. 2 illustrating, by way of a flow diagram, a non-limiting example of a method 20 for determining properties of a gemstone sample and/or determining a relationship/comparison between at least two gemstone samples, in accordance with the presently disclosed subject matter.

It is noted that, the steps of method 20 can be applied to a single gemstone sample to determine its properties, or to a plurality of gemstone samples to determine a relationship between them, as was described above with respect to method 10.

It is also noted that, in some embodiments not all of the steps are performed but only part of them.

Steps 22A and 22B are identical to steps 12A and 12B or 14A and 14B described above.

In step 24A, the gemstone sample is illuminated, from one or more angles/directions/elevations, with a visible white light. In some embodiments, the gemstone sample is illuminated with a white, high color rendering index (CRI) light. In some embodiments, the gemstone sample is illuminated through one or more of its facets. In one example, when examining a parted gemstone, the gemstone is illuminated through its table facet.

In step 24B, a corresponding at least one transmittance/absorbance light spectrum is recorded (using a spectrometer).

In step 26, the gemstone sample is imaged and one or more images are acquired, from one or more angles/directions/elevations. In some embodiments, the images are acquired while no illumination is used in addition to ambient light. In some embodiments, the images are acquired while the gemstone sample is excited by the fluorescence-exciting light (step 22A). In this case, the images may be indicative of fluorescence zone(s)/area(s)/volume(s) within the gemstone sample. In some embodiments, the images are acquired while the gemstone sample is illuminated by the visible white light (step 24A). In this case, the images can be indicative of a 3D model of the gemstone sample. In some embodiments, the images are acquired while the gemstone sample is illuminated by both the fluorescence-exciting light (step 22A) and the visible white light (step 24A). Also here, the images can be indicative of fluorescence zone(s)/area(s)/volume(s) within the gemstone sample.

In step 28, the data acquired in steps 22B, 24B and 26 is analyzed. In some embodiments, the data is analyzed individually. In some embodiments, the data from the various steps is analyzed collectively, either on a partial basis or totally. Some of the analysis outputs are described above, e.g. as described in method 10. In some embodiments, the output can be indicative of one or more of the following properties of the gemstone sample: fluorescence-signature, absorbance-signature, 3D model, and/or fluorescence zone(s)/area(s)/volume(s) locations.

In some embodiments, the 3D model is used as part of the analysis. In one embodiment, raytracing models would be utilized to compare the measured and expected outputs after polishing (both intensity and spectral data), based on the emission before polishing and the 3D models of the rough and polished stones.

In step 29, based on the analysis step 28, properties of the gemstone sample(s) are determined on an individual basis, or a relationship between a plurality of examined gemstone samples are determined.

It is appreciated, that the steps 22A, 22B, 24A, 24B, and 26 can be repeated for each examined gemstone sample. When only a single gemstone sample is examined, steps 28 and 29 are applied on an individual basis. If a plurality of gemstone samples are examined, step 28 can be applied in various scenarios. In one example, the results of all steps are analyzed for each gemstone sample individually, then a comparison between the gemstone samples is performed according to step 29. In another example, the results of one step (e.g. 22B, 24B, 26) are analyzed on multiple basis between the plurality of gemstone samples in order to determine a relationship in step 29.

Figure 3:
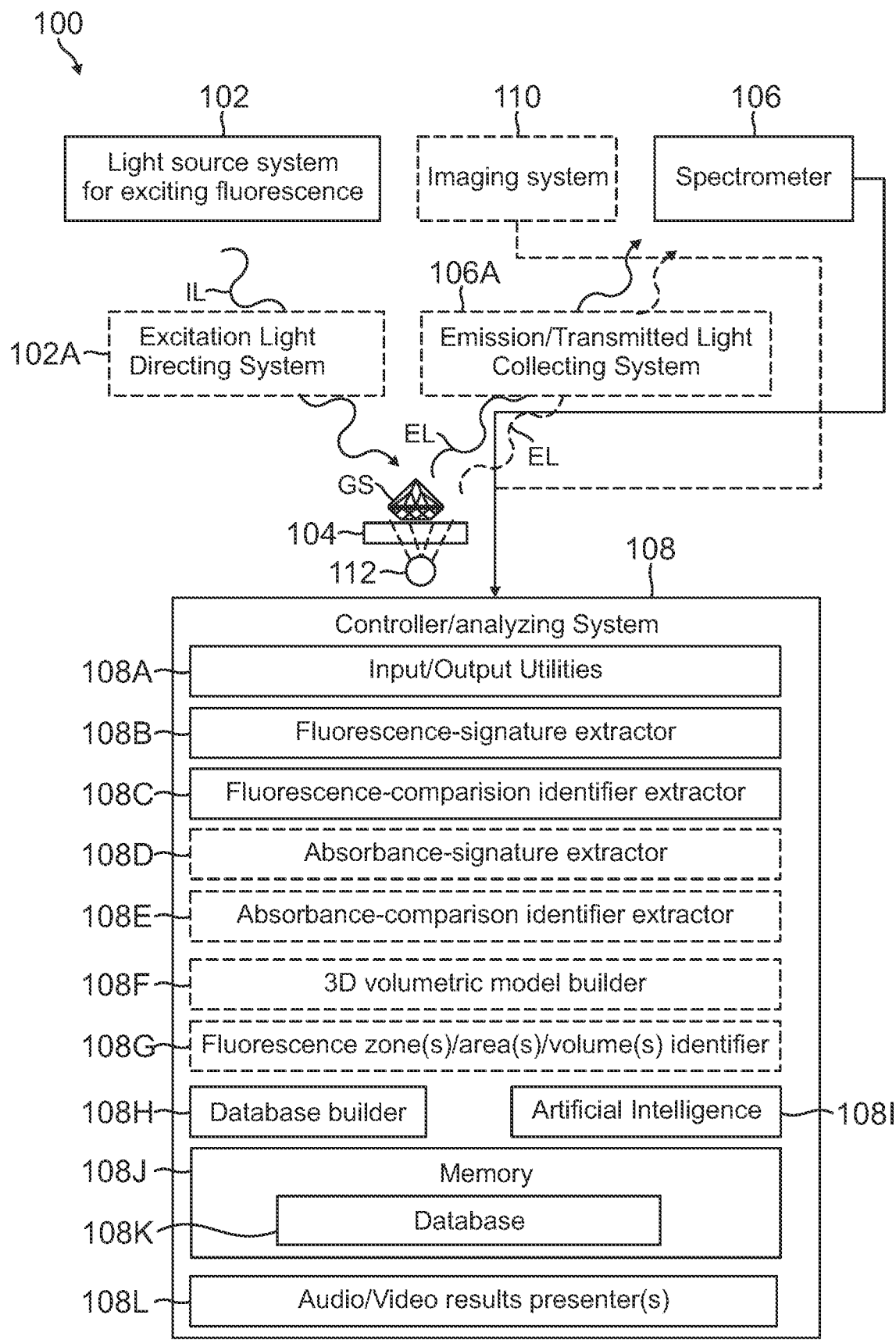
FIG. 3 illustrates a non-limiting exemplary embodiment of a system for determining a relationship between gemstones according to the presently disclosed subject matter.

Reference is now made to FIG. 3 illustrating, by way of a block diagram, a non-limiting example of a system 100 for determining properties of a gemstone or for determining a relationship/comparison between two gemstone samples, in accordance with the presently disclosed subject matter. The system 100 includes a light source system 102 configured and operable to generate illumination (also referred to as excitation) light(s) IL configured to excite fluorescence in at least one gemstone sample GS under test, a holding stage 104 configured to hold the at least one gemstone sample GS in the illumination zone(s) covered by the illumination light(s) IL, a spectrometer 106 located in the detection zone(s) and configured and operable to detect emission light(s) EL emitted by the at least one gemstone sample and record corresponding fluorescence-emission spectrums, and a controller/analyzing system 108 configured and operable to operate the system's various components and functions, analyze the fluorescence-emission spectrums and determine properties of a gemstone and/or a relationship between at least two examined gemstone samples, as described above.

In some embodiments, the system 100 includes a white high color rendering index light source (CRI) 112 configured and operable for illuminating through the gemstone sample with white visible light. In some embodiments, the CRI light source 112 is located such that it illuminates through the table of the diamond gemstone. Utilization of a source with high CRI provides a dual advantage, in that it a) enables comparison with a good signal-to-noise ratio by providing a relatively even distribution of intensity across the visible spectrum, and b) allows for improved estimation of the color of the polished diamond under standard (daylight) conditions. In this case, the absorbance spectrum of the gemstone sample is measured, by detecting at the spectrometer 106 the transmitted light TL. The absorbance spectrum can be analyzed at the controller/analyzing system 108 for use in determining properties of the gemstone sample and/or a relationship between at least two examined gemstone samples.

In some embodiments, the system 100 includes an excitation light directing system 102A configured and operable to direct the fluorescence-illumination light(s) IL between the light source system 102 and the at least one gemstone sample GS located in the illumination zone(s). Non-limiting examples of the excitation light directing system are described further below. While not illustrated in the figure, the system 100 can also include a light directing system configured and operable to direct the white light of the CRI light source 112, when provided, towards the gemstone sample.

In some embodiments, the system 100 includes an emission/transmitted light collecting system 106A configured and operable to collect and direct the emission light(s) EL, and the transmitted light TL from the CRI light source 112, when provided, between the at least one gemstone sample GS and the spectrometer 106. Non-limiting examples of the emission light collecting system are described further below.

The light source system 102 includes one or more light sources configured and operable to generate the illumination light(s) in desired wavelengths and intensities that excite a fluorescence reaction in the gemstone sample(s) GS. In some embodiments, the light source(s) is/are LED. LEDs are chosen for typically being, inter alia, low cost, long lived, and more efficient than other sources. In some embodiments, the light source(s) configured to generate the illumination light are in the UV range. Alternatively, the light source(s) may produce a broadband light and the light source system 102 may include filters that selectively pass light in the UV range towards the gemstone sample(s). In some embodiments, the light source system 102 is configured to generate an illumination light in the UVA, UVB and UVC ranges. In some embodiments, the illumination light may have a 365 nm, 310 nm and/or 265 nm component. In some embodiments, the light source system 102 includes at least one light source and a plurality of filters that selectively pass the above-mentioned wavelengths. In some embodiments, the light source system 102 is configured to generate the illumination light in different wavelengths sequentially. In some embodiments, the light source system 102 is configured to generate the illumination light in different wavelengths simultaneously.

In some embodiments, the holding stage 104 is configured to be rotatable so as to enable exposing the gemstone sample GS to the illumination light(s) IL and enable detection of the fluorescence emission light(s) EL from different angles or directions or orientations. Alternatively, the light source system 102 and/or the spectrometer 106 may be configured to rotate relative to the holding stage 104 and the gemstone sample located thereon.

In some embodiments, the system 100 includes an imaging system 110 configured and operable to acquire images of the gemstone sample under test, in addition to the spectral data acquired by the spectrometer 106. The white light generated by the CRI light source 112 can enhance the images acquired. The images are analyzed at the controller/analyzing system 108. The images can be indicative of one or more of the following: three-dimensional, volumetric model of the gemstone sample, fluorescence images of the excited gemstone sample. Measuring the three-dimensional model of the rough gemstone sample is a way for authenticating its origin. Three-dimensional external and/or internal features are good identifiers and tracers of the gemstone sample until they are partially/totally lost during the polishing process. Accordingly, the imaging data is very helpful in determining whether two rough parted gemstones have the same or different origins. Such imaging data can also allow identification of distinct fluorescent zones/areas in the parted diamond that could then be verified in its polished counterpart. In some embodiments, the imaging is performed when the diamond is immersed in a fluid with a high index of refraction. Use of such fluid can significantly aid in mapping the precise locations of the distinct fluorescent zones/areas/volumes in the parted and polished diamond, as it can greatly reduce the percentage of reflected light within the stone, preventing mirror images and significantly increasing the overall contrast. As the percentage of light reflected from an interface depends highly on the differences in the index of refraction between the two media, a large reduction in reflections can be achieved even when the indices of refraction do not fully match. For example, because a diamond has an index of refraction of 2.4, at normal incidence, 16.95% of light will be reflected at the diamond-air interface. However, using an index matching fluid with a modest index of refraction of 1.5 reduces this percentage to 5%, and other liquids can lower this even further to ~2%. In some embodiments, the spectral data collected can be utilized to help verify that the diamond under test is of a natural origin. Diamonds with suspicious spectra could then be referred for further analysis, when needed.

In some embodiments, when the imaging system 110 is provided, a modelling illumination source (not shown in the figure) is provided in order to enhance the imaging process. In some embodiments, the modelling illumination source would be located opposite the imaging system, as this is specifically useful for obtaining a high-quality 3D volumetric model of the gemstone sample.

The controller/analyzing system 108 is generally a computing system that includes input/output utilities 108A, such as wired or wireless communication modules, for interfacing with and controlling the different components of the system 100. For example, controlling the light source system 102 and/or the CRI light source 112, and receiving the fluorescence-emission and/or the transmittance/absorbance light spectrums data from the spectrometer 106.

The controller/analyzing system 108 also includes modules, which are software-or hardware-based modules, for analyzing the data received from the spectrometer 106 and the optionally provided imaging system 110. One or more of the modules can be cloud-based module(s).

A fluorescence-signature extractor module 108B is provided to individually analyze the fluorescence-emission spectrum(s) received from each gemstone sample and generate fluorescence-signature(s) for the gemstone sample, then utilize the fluorescence-signature(s), e.g. by comparing between fluorescence-signature(s) of various gemstone samples, to determine the relationship between the gemstone samples. In some embodiments, the fluorescence-signature extractor module 108B is configured to perform step 16A above. In some embodiments, the analysis can be useful to determine that a first and a second gemstone samples belong to same/different origins, i.e. belonging/not belonging to same gemstone along the manufacturing process.

A fluorescence-comparison identifier extractor module 108C is provided to apply a direct comparison between the fluorescence-emission spectrums that belong to different gemstone samples, and generate fluorescence comparison identifiers, then utilize the comparison identifiers to determine the relationship between the different gemstone samples. In some embodiments, the fluorescence-comparison identifier extractor module 108C is configured to perform step 16B above. In some embodiments, the fluorescence-comparison identifier extractor module 108C is configured to determine that a first and a second gemstone samples belong to same originally acquired gemstone (traceability). The comparison between the spectrums can include any of the known mathematical operations, or a combination thereof, being used for this kind of spectral analysis, such as maximum, minimum, difference, threshold difference and so on.

In some embodiments, when a CRI light source is provided, an absorbance-signature extractor module 108D is provided to individually analyze the absorbance spectrum(s) received from each gemstone sample and generate absorbance-signature(s) for the gemstone sample, then utilize the absorbance-signature(s), e.g. by comparing between absorbance-signature(s) of various gemstone samples, to determine the relationship between the gemstone samples. In some embodiments, the analysis can be useful to determine that a first and a second gemstone samples belong to same/different origins, i.e. belonging/not belonging to same gemstone along the manufacturing process.

In some embodiments, when a CRI light source is provided, an absorbance-comparison identifier extractor module 108E is provided to apply a direct comparison between the absorbance spectrums that belong to different gemstone samples, and generate absorbance comparison identifiers, then utilize the comparison identifiers to determine the relationship between the different gemstone samples. In some embodiments, the absorbance-comparison identifier extractor module 108E is configured to determine that a first and a second gemstone samples belong to same originally acquired gemstone (traceability). The comparison between the spectrums can include any of the known mathematical operations, or a combination thereof, being used for this kind of spectral analysis, such as maximum, minimum, difference, threshold difference and so on.

In some embodiments, when an imaging system 110 is provided, a three-dimensional, volumetric model builder 108F is provided being configured and operable to generate a 3D model of the gemstone sample. The controller/analyzing system 108 can be configured and operable, e.g. by the volumetric model builder 108F, to perform a comparison analysis between two 3D models obtained on two gemstone samples, to determine a relationship between them.

In some embodiments, when an imaging system 110 is provided, a fluorescence zone(s)/area(s)/volume(s) identifier 108G is provided being configured and operable to detect fluorescence zone(s)/area(s)/volume(s) in the gemstone sample and generate fluorescence zone(s)/area(s)/volume(s) map. The controller/analyzing system 108 can be configured and operable, e.g. by the fluorescence zone(s)/area(s)/volume(s) identifier 108G, to perform a comparison analysis between two fluorescence zone(s)/area(s)/volume(s) maps obtained on two gemstone samples, to determine a relationship between them.

In some embodiments, the controller/analyzing system 108 can be configured and operable to integrate between the analysis data obtained by one or more of the modules 108B through 108G in order to determine properties of the gemstone sample and/or determine a relationship between at least two gemstone samples.

A database builder module 108H can be provided to save, into a memory 108J, a database 108K of fluorescence-signatures and/or fluorescence comparison identifiers and/or absorbance-signatures and/or absorbance comparison identifiers and/or 3D models and/or fluorescence zone(s)/area(s)/volume(s) maps obtained by the modules 108B through 108G. The memory 108J and the database 108K can be remote and accessed via network. The modules 108B through 108G can be configured to access the database and perform a comparison between the analysis results of gemstone samples under test to the database in order to determine properties of a gemstone sample/relationship between different gemstone samples.

An Artificial Intelligence module 108I (e.g., machine learning and/or deep learning module) can be used to determine fluorescence signatures and/or comparison identifiers and/or absorbance-signatures and/or absorbance comparison identifiers and/or 3D models and/or fluorescence zone(s)/area(s) maps, and determine the properties of/relationship between the gemstone sample(s) under test.

The controller/analyzing system 108 may include audio/video analysis results presenter(s) 108K, such as display(s) and speaker(s), configured and operable to present the results of the analysis to a user of the system.

Figure 4A:
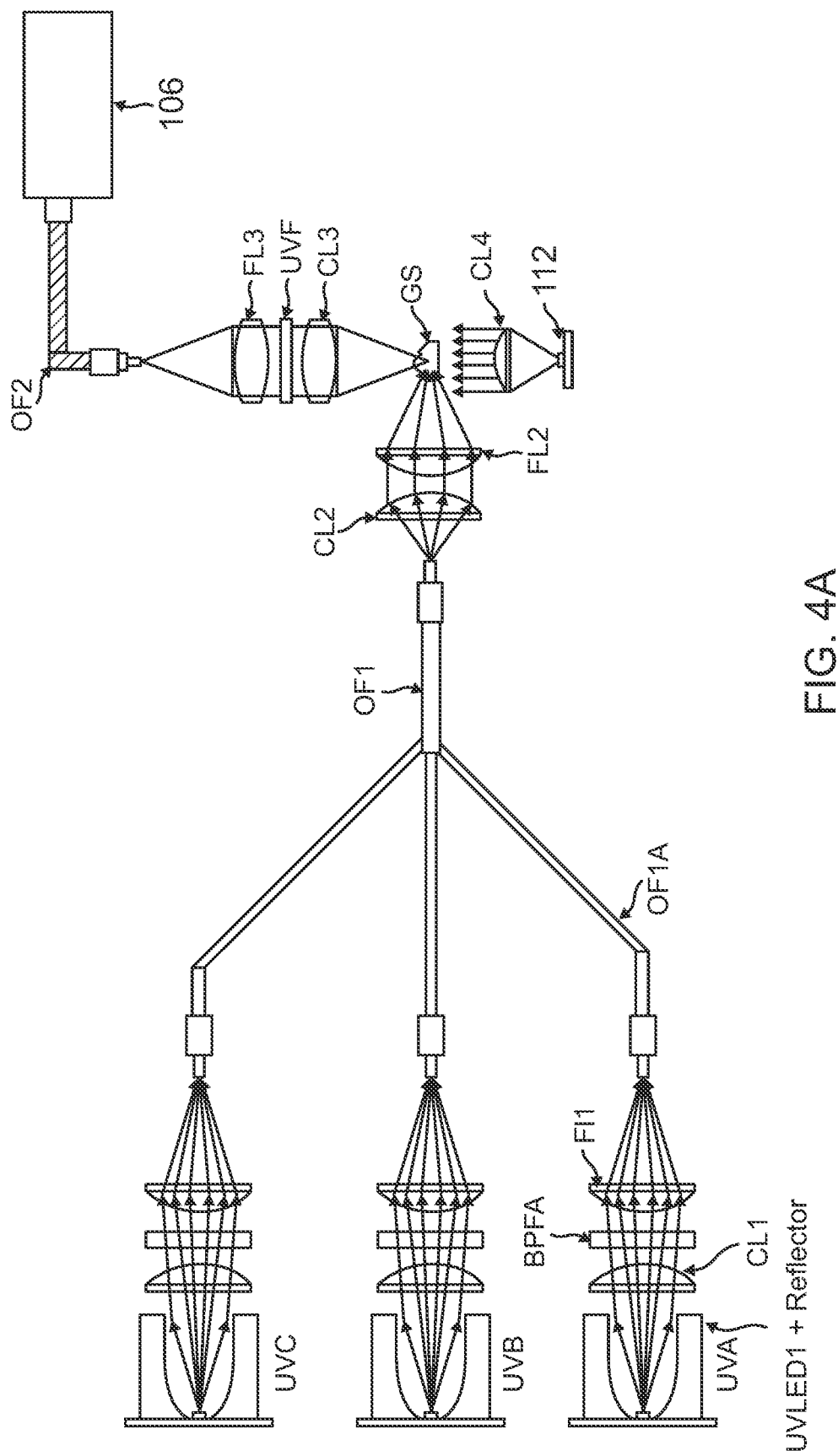
FIGS. 4A-4C illustrate non-limiting examples of parts of a system for determining a relationship between gemstones according to the presently disclosed subject matter.
Figure 4B:
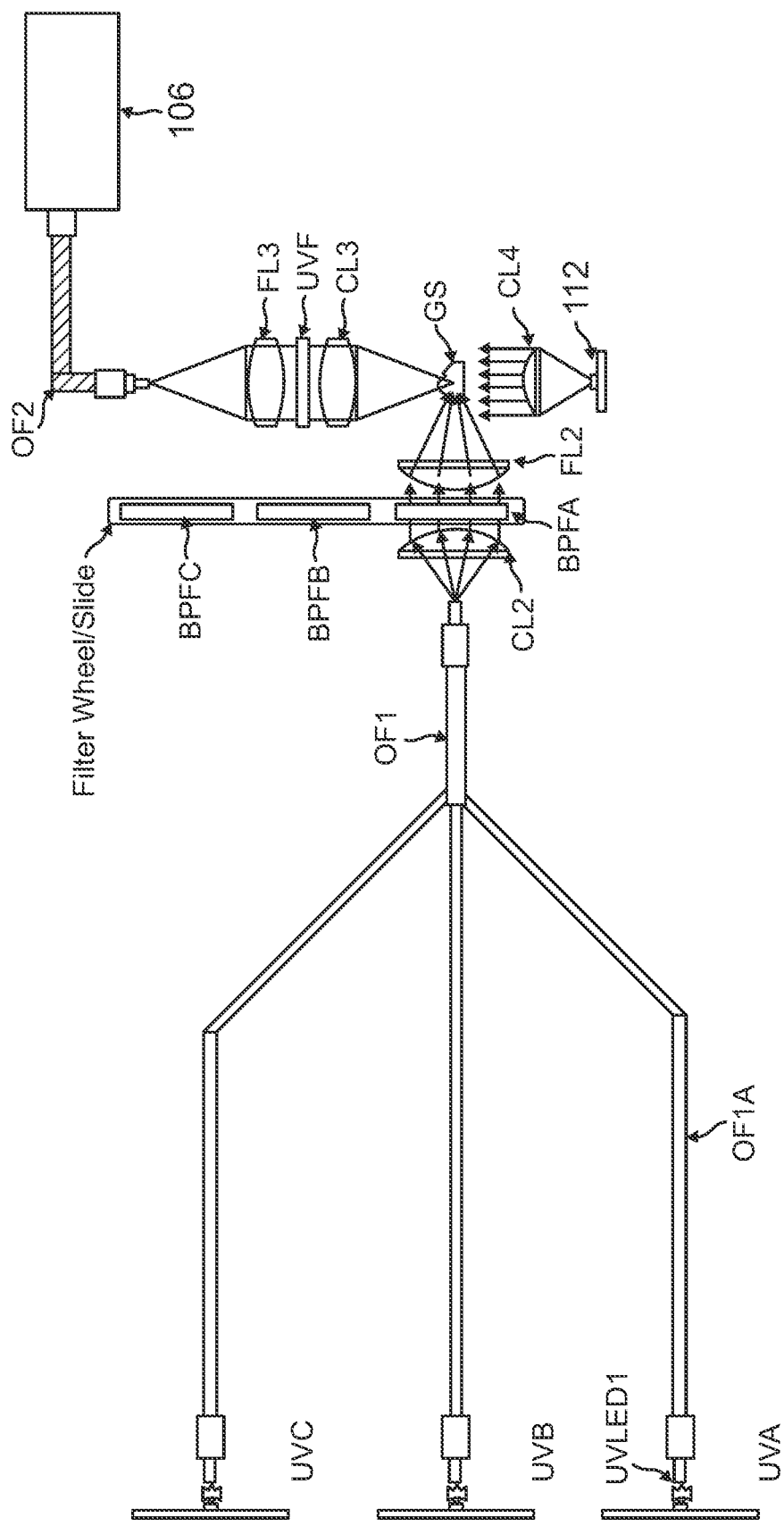
Figure 4C:
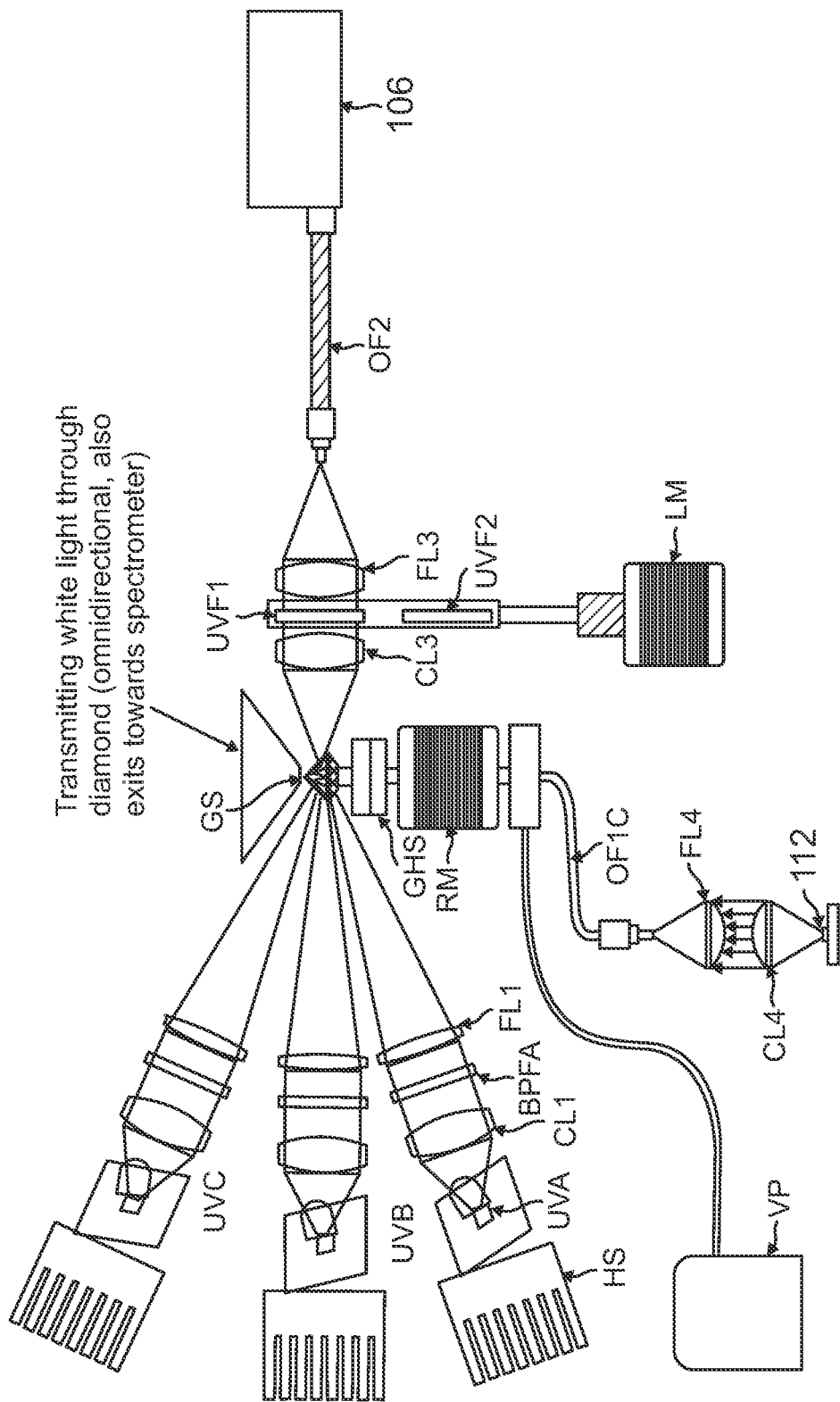

Reference is now made to FIGS. 4A to 4C, illustrating non-limiting examples of various components, with emphasis on optical components and setups, of the system of the presently disclosed subject matter.

In all FIGS. 4A-4C the light source system includes three exemplary light sources, typically efficient LED sources, with three corresponding bandpass filters operable to illuminate the gemstone sample under test with three illuminating light beams in the UVA, UVB and UVC ranges, specifically having wavelengths of about 365 nm, 310 nm and 265 nm (in this application, about means+/−5 nm).

In FIG. 4A, the light sources are LEDs located within respective reflectors (that help in defining a direction of the illumination light). The excitation light directing system, includes in this order distally from the light sources, for each illumination light, a collimation lens (e.g. CL1 coupled to UVA light source), a focusing lens (e.g. FL1 coupled to UVA light source) for coupling the illumination light to an optical fiber (e.g. OF1A), a collimation lens CL2 for collecting the illumination light from the optical fiber (e.g. from a common optical fiber OF1 combining all three optical fibers coupled to the three light sources), and a focusing lens FL2 for focusing the illumination light on the gemstone sample GS. The UV bandpass filter (e.g. BPFA coupled to the UVA light source) is located between the collimation lens (e.g. CL1) and the focusing lens (e.g. FL1). The emission/transmitted light collecting system includes, moving distally of the UV LED and reflector, a collimation lens CL3, a UV excluding filter UVF configured and operable to filter out the UV excitation wavelength(s), a focusing lens FL3 for coupling the emission light to an optical fiber OF2 directly coupled/connected to the spectrometer 106. A CRI light source 112 followed by a collimating lens CL4 is located beneath the gemstone sample GS and operable to illuminate the gemstone sample via its table side. Using optical fibers at different locations in the system may help in saving space within an apparatus accommodating the system of the presently disclosed subject matter.

In FIG. 4B, the light sources UVA-UVC are directly coupled to respective optical fibers, eliminating the need for the projection arrangement of collimations lens CL1 and focusing lens FL1. The excitation light directing system, includes in this order distally from the light sources, for each illumination light, an optical fiber (e.g. OF1A coupled to light source UVA) directly coupled to the light source, a collimation lens CL2 for collecting the illumination light from the optical fiber (e.g. from a common optical fiber OF1 combining all three optical fibers coupled to the three light sources), and a focusing lens FL2 for focusing the illumination light on the gemstone sample GS. The UV bandpass filters BPFA, BPFB and BPFC, are located, in the collimated illumination light zone, between the collimation lens CL2 and the focusing lens FL2. In this specific non-limiting example, the UV bandpass filters are arranged on a wheel or a slide that enables selecting each of the filters as needed. The emission light collecting system includes the same components as in FIG. 4A. A CRI light source 112 followed by a collimating lens CL4 is located beneath the gemstone sample GS and operable to illuminate the gemstone sample via its table side.

In FIG. 4C, the gemstone sample is directly illuminated by the light sources, without the use of optical fibers. This can be a good setup whenever no space limitation is of interest. As shown, each of the light sources is mounted on a heat sink (e.g. HS) for increasing efficiency of the LEDs by controlling their temperature. The excitation light directing system, includes in this order distally from the light sources, for each illumination light, a collimation lens (e.g. CL1 coupled to UVA light source) and a focusing lens (e.g. FL1 coupled to UVA light source) for focusing the illumination light on the gemstone sample GS. The UV bandpass filter (e.g. BPFA coupled to the UVA light source) is located between the collimation lens (e.g. CL1) and the focusing lens (e.g. FL1) such that it is in the collimated illumination light zone. The emission light collecting system includes the same components as in FIG. 4A, except for using two UV excluding filters UVF1 and UVF2 being individually selected and configured and operable to filter out the UV excitation wavelength(s). In such a system, for example, one UV filter can be selected so that it only transmits visible light, and another so that it can also transmit UVA emission. This would allow collecting a wider fluorescence emission band when exciting with UVB and UVC illumination, yet still filtering out the UVA excitation light when it is used for inducing fluorescence. In this example, the two filters are individually selected by being mounted on a linear motor LM that selectively holds the chosen filter in the path of the collimated emission light between the collimation lens CL3 and the focusing lens FL3.

In this example, the CRI light source 112 is coupled to a collimation lens CL4, followed by a focusing lens FL4 configured and operable to focus the CRI visible white light onto an input of an optical fiber OF1C which has its output directly coupled to the gemstone sample GS.

Additional features shown, are a gemstone holding stage GHS on which the gemstone sample is immobilized by applied vacuum via a vacuum pump VP, a rotation motor RM for rotating the holding stage GHS and the gemstone sample GS held thereon.

It is appreciated that other structures of the different components of the system are available, and the above-described examples are only exemplary and not limiting the presently disclosed subject matter.

Figure 4D:
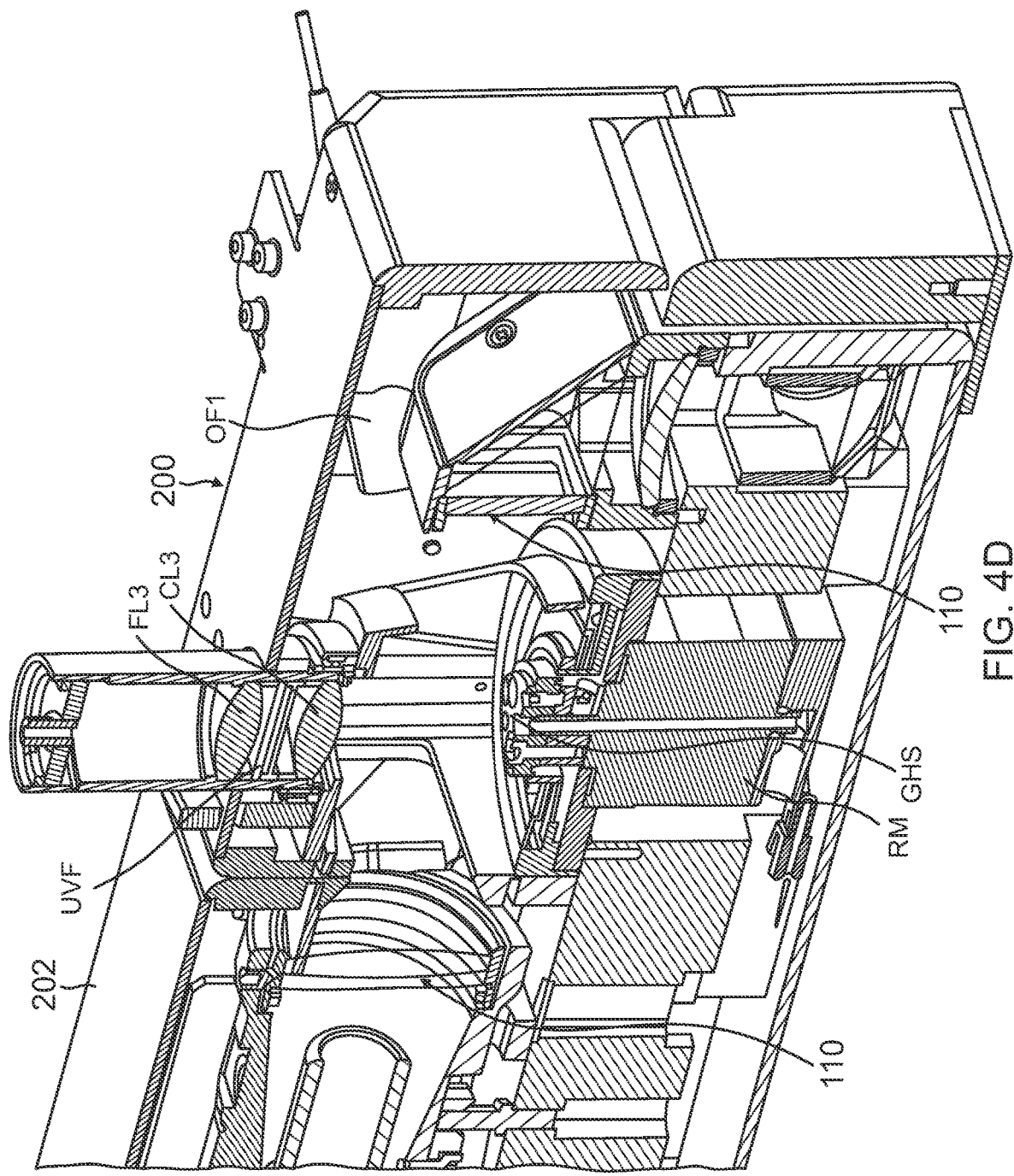
FIG. 4D illustrates a non-limiting exemplary embodiment of an apparatus partially incorporating the system for determining a relationship between gemstones according to the presently disclosed subject matter

Reference is now made to FIG. 4D illustrating an exemplary embodiment of an apparatus 200 utilizing the system(s) of the presently disclosed subject matter. Specifically, the shown apparatus is an updated version of the DiaExpert™ system owned by the applicant. The apparatus 200 has an enclosure 202 inside which the system 100 together with the optional imaging system 110 are mounted. As shown, the enclosure 202 includes the rotating motor RM, the gemstone holding rotatable stage GHS, the emission light collecting system with the collimating lens CL3, the UV excluding filter UVF and the focusing lens FL3, arranged in this order. Also shown is the optical fiber OF1 configured for coupling the fluorescence-exciting illumination light to the gemstone sample under examination. The DiaExpert™ system also possesses a rear illumination module and an imaging module, which, together with the rotation motor and proprietary software, allow the generation of an accurate 3D model of the stone under test. In addition, the test chamber is optically sealed, so that ambient light is prevented from affecting the fluorescence measurements. Furthermore, the imaging system used for generating the 3D model can also be utilized in conjunction with the rotation motor to map fluorescent zones/areas/volumes in the gemstone sample under test, upon activation of one or more of the UV illumination sources. The fluorescent zones/areas/volumes can then, for example, be projected onto the 3D model of the gemstone sample under test and used in planning the polishing of the gemstone, as a point of comparison between the polished and parted/rough stone, or in generating a model for purely aesthetic purposes.

Reference is now made to FIGS. 5A-5D illustrating a first example utilizing the technique of the presently disclosed subject matter. In this example, the fluorescence-emission spectrums, of three parted gemstone samples S1, S2 and S3, in response to excitation by three light wavelengths, are presented.

Figure 5A:
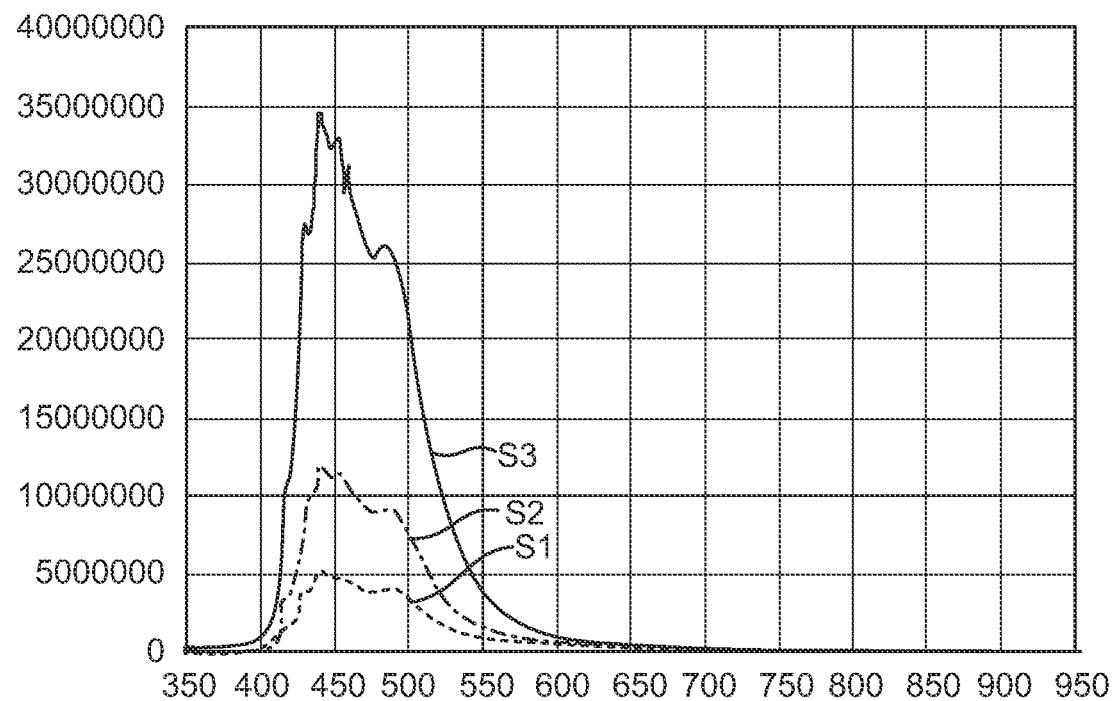
FIGS. 5A-5D illustrate a non-limiting example for using the methods and systems of the presently disclosed subject matter for determining relationships between gemstone samples.

FIG. 5A illustrates the three fluorescence-emission spectrums of the three parted gemstones, when illuminated by a 365 nm UV light. In this figure, the three spectrums are presented with the full detected intensity. It has been found by the inventors that when comparing the fluorescence-emission spectrums of the rough and polished states of a single gemstone, there is a difference in the overall intensity that may prevent correct identification. Therefore, the fluorescence-emission spectrums should preferably be normalized to eliminate the differences in intensities which may lead to false decisions. Overall intensity, however, can still be utilized as a factor in comparison, but is less reliable in the comparison of spectrums. In the described example, the fluorescence-emission spectrums S1-S3 belong to three different parted gemstones, so the differences between the gemstones are reflected in the intensities.

Figure 5B:
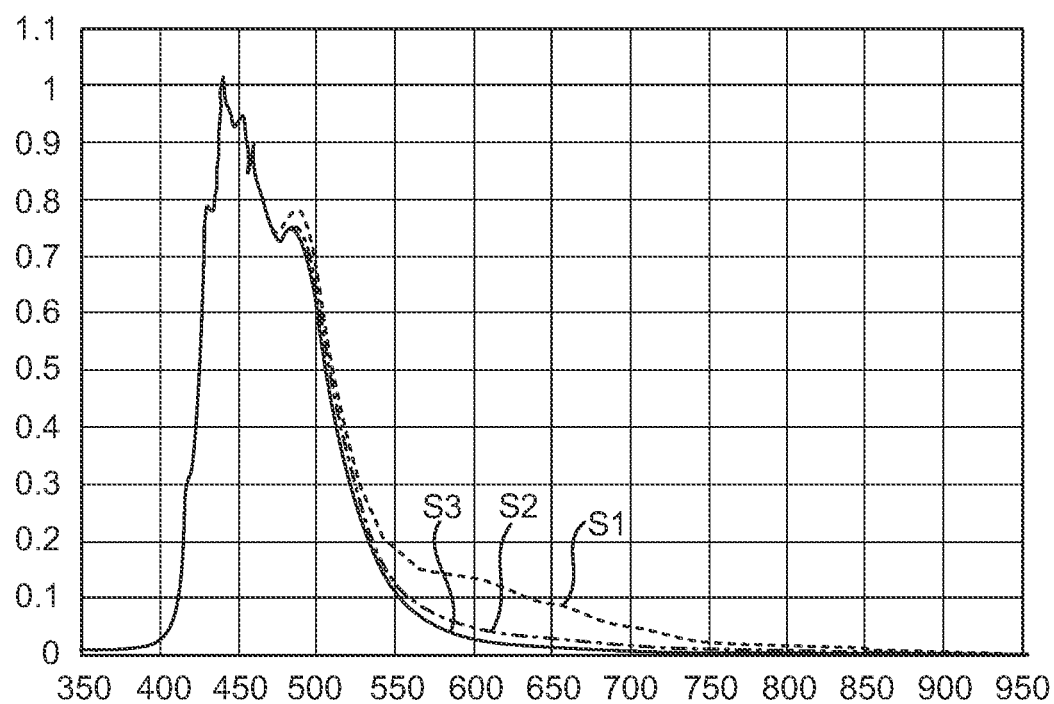

However, as can be seen in FIG. 5B, illustrating the three normalized fluorescence-emission spectrums resulting from excitation by the light having a wavelength of 365 nm, it is not necessarily possible to differentiate between the three different gemstones from this single excitation wavelength alone.

Figure 5C:
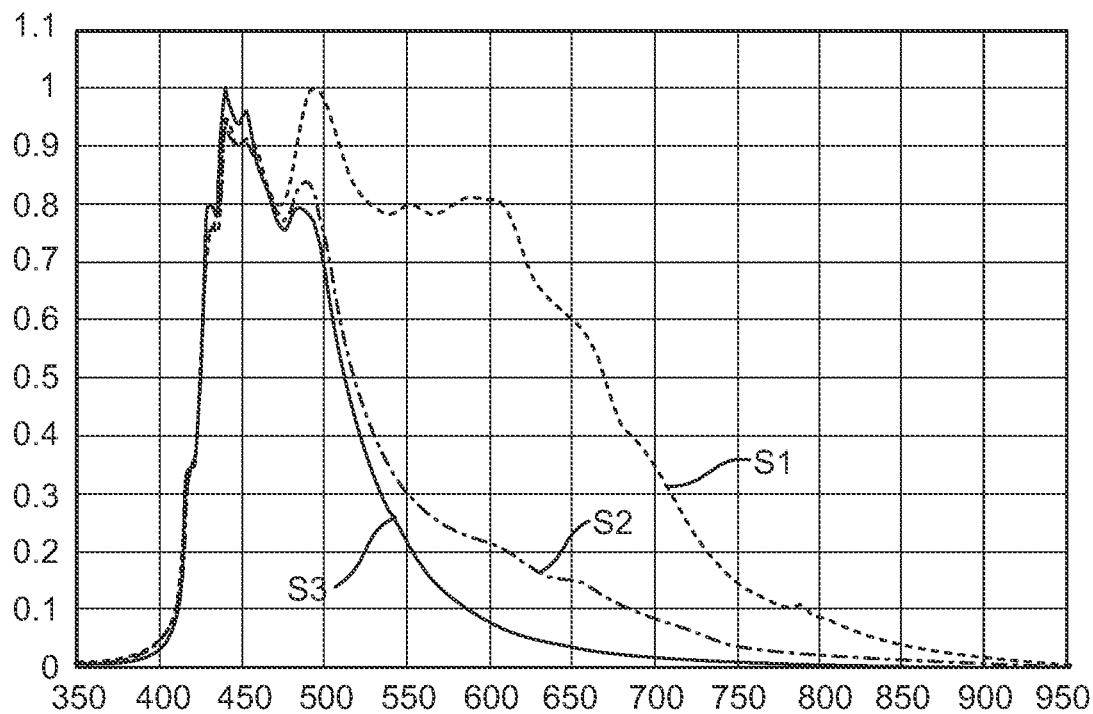

FIG. 5C illustrates the three normalized fluorescence-emission spectrums of the three gemstones when excited by light having a wavelength of 310 nm. As shown in the figure, using this excitation wavelength, it is possible to identify and differentiate the gemstone S1 from S2 and S3. However, differentiation between S2 and S3 is still not as reliable because both have similar fluorescence in this wavelength.

Figure 5D:
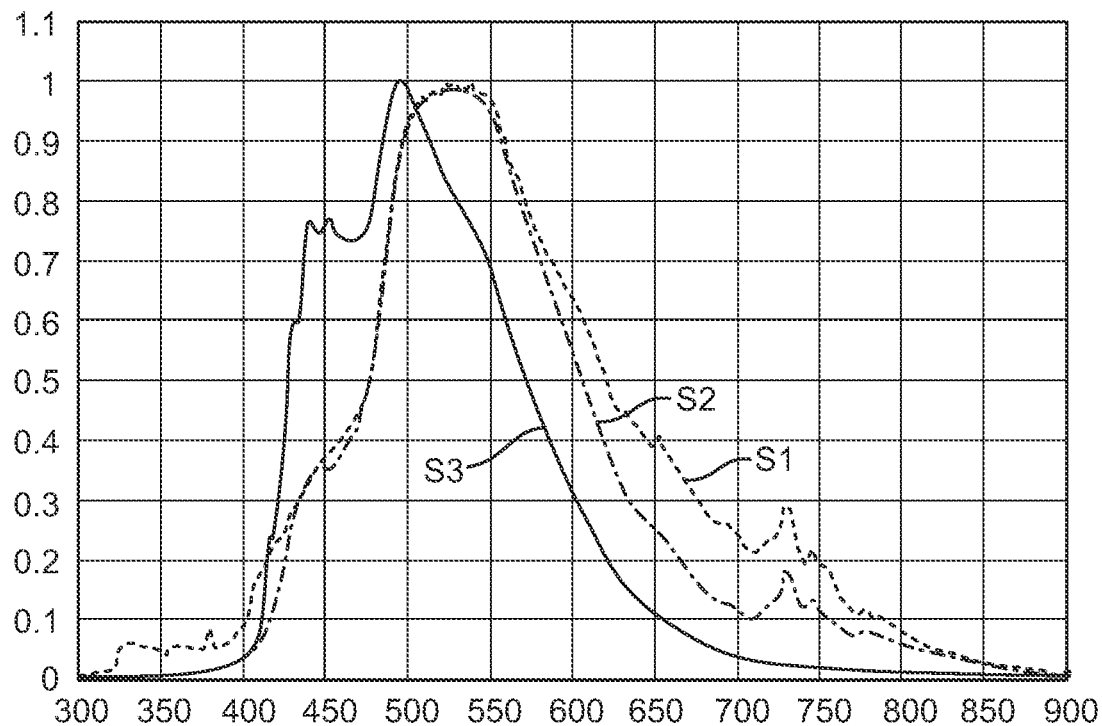

FIG. 5D, illustrates the three normalized fluorescence-emission spectrums of the three gemstones when excited by light having a wavelength of 265 nm. As shown in the figure, using this excitation wavelength, it is possible to identify and differentiate the gemstone S3 from the rest. Although, it is challenging to differentiate between S1 and S2 at this excitation wavelength, since S1 is differentiated using the light of wavelength 310 nm (FIG. 5C), it is now possible to differentiate between the three gemstones, verifying that they are three different gemstones. In general, it is possible to use additional excitation wavelengths to collect further spectrums for comparison, thus allowing for even better differentiation between different gemstones.

Figure 6A:
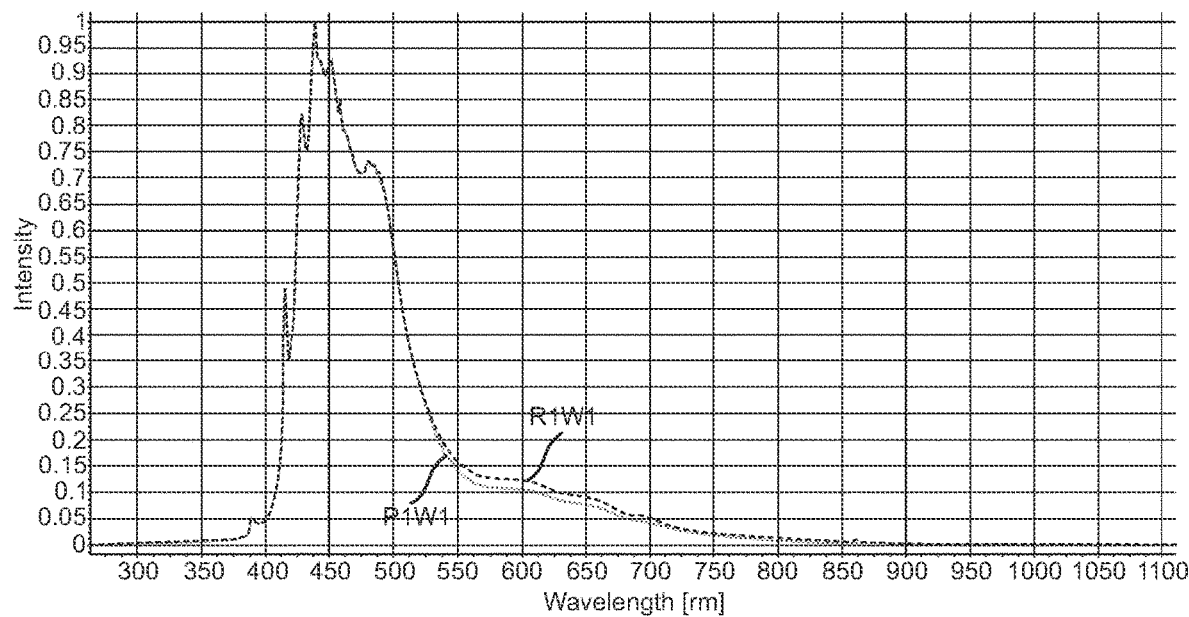
FIGS. 6A-6C illustrate another non-limiting example for using the methods and systems of the presently disclosed subject matter for determining relationships between gemstone samples.
Figure 6B:
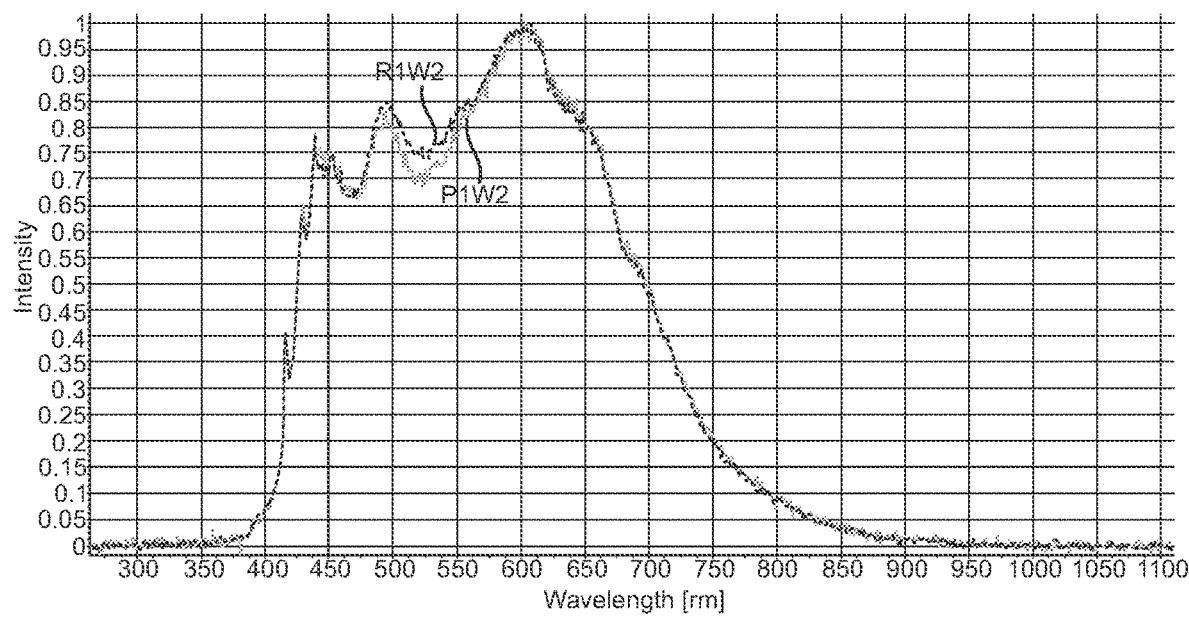
Figure 6C:
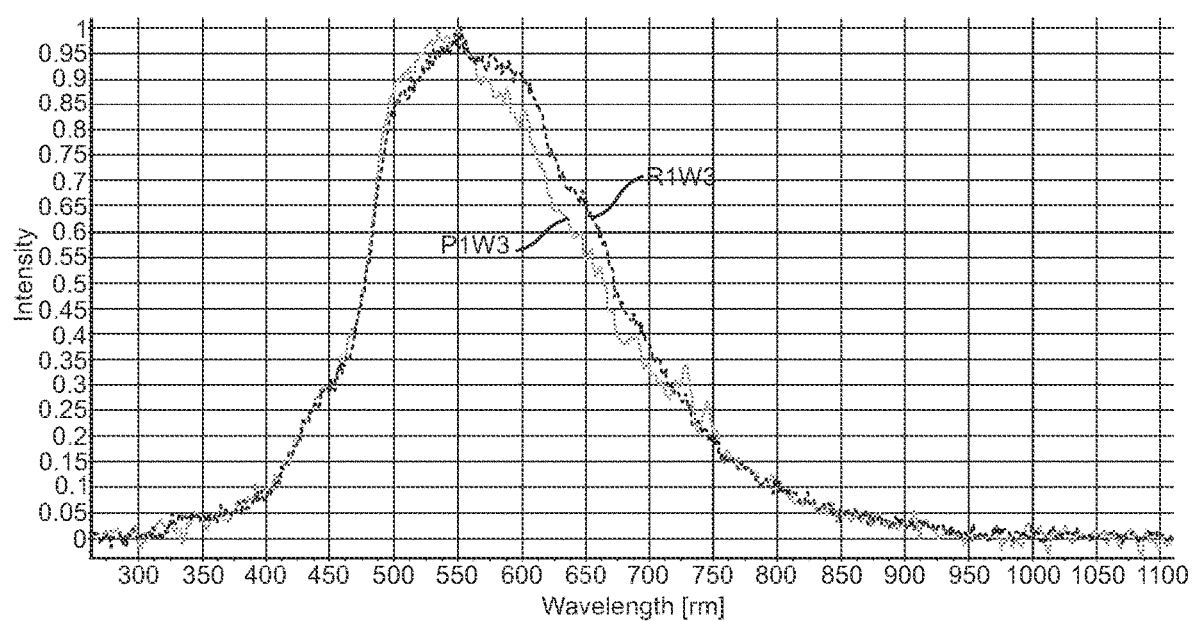

Reference is now made to FIGS. 6A-6C illustrating an example utilizing the technique of the presently disclosed subject matter. In this example, the normalized fluorescence-emission spectrums, of a rough/parted gemstone sample and its polished product, in response to excitation by the three light wavelengths, are presented. Each of the graphs shows two fluorescence-emission spectrums belonging to the gemstone sample in rough/parted state and polished state. The dashed lines refer to the rough/parted stone and the continuous lines refer to the polished stone.

FIG. 6A shows the normalized fluorescence-emission spectrums R1W1 and P1W1 of the gemstone sample in its rough/parted and polished states respectively, when being excited by 365 nm UV light. As appreciated, the two spectrums are substantially similar indicating that the samples are connected and come from the same rough gemstone.

FIG. 6B shows the normalized fluorescence-emission spectrums R1W2 and P1W2 of the gemstone sample in its rough/parted and polished states respectively, when being excited by 310 nm UV light. Also here, the two spectrums are substantially similar indicating that the samples are connected and come from the same rough gemstone.

FIG. 6C shows the normalized fluorescence-emission spectrums R1W3 and P1W3 of the gemstone sample in its rough/parted and polished states respectively, when being excited by 265 nm UV light. Also here, the two spectrums are substantially similar indicating that the samples are connected and come from the same rough gemstone.

The invention claimed is:

1. A method for determining a relationship between at least two gemstone samples, the method comprising:
    illuminating a first gemstone sample with illuminating light of at least one fluorescence-exciting wavelength range;
    detecting and recording a corresponding at least one first fluorescence-emission light spectrum emitted from the first gemstone sample;
    illuminating a second gemstone sample with the illuminating light of the at least one fluorescence-exciting wavelength range;
    detecting and recording a corresponding at least one second fluorescence-emission light spectrum emitted from the second gemstone sample;
    analyzing the at least one first fluorescence-emission spectrum and at least one second fluorescence-emission spectrum; and
    determining a relationship between the first and second gemstone samples;

wherein said analyzing of the at least one first fluoroescence-emission spectrum and at least one second fluorescence-emission spectrum comprises at least one of the following:
  independently analyzing the first and second fluorescence-emission spectrums and respectively generating first and second fluoroescence-signatures, then utilizing the first and second fluorescence-signatures to determine the relationship between the first and second gemstone samples;
  applying a direct comparison between the first and second fluorescence-emission spectrums and generating fluorescence comparison identifiers, then utilizing the comparison indentifiers to determine the relationship between the first and second gemstone samples.

2. The method according to claim 1, further comprising at least one of the following:
  building a database of fluorescence-signatures and/or fluorescence comparison identifiers, then comparing the analysis results of the first and/or second gemstone samples to the database in order to determine the relationship between the first and second gemstone samples;
  utilizing Artificial Intelligence methods to generate fluorescence signatures and/or comparison identifiers for the first and/or second gemstone samples and determine the relationship between the first and second gemstone samples; and
  utilizing Artificial Intelligence methods to determine the relationship between the first and second gemstone samples based on the comparison identifiers.

3. The method according to claim 1, wherein said illuminating light of at least one fluorescence-exciting wavelength range comprises at least one of the following: UVA range, UVB range and UVC range.

4. The method according to claim 1, wherein said illuminating light of at least one fluorescence-exciting wavelength range comprises at least one of the following wavelengths: 365 nm, 310 nm and 265 nm.

5. The method according to claim 1, further comprising:
  illuminating through the first and second gemstone samples with visible white light;
  detecting and recording corresponding at least one absorbance light spectrum of each of the first and second gemstone samples; and
  analyzing the absorbance light spectrums to determine the relationship between the first and second gemstone samples.

6. The method according to claim 1, further comprising:
  imaging the first and second gemstone samples;
  acquiring respective images of the first and second gemstone samples, the images being indicative of at least one of the following: fluorescence zones within the first and second gemstone samples, and three-dimensional models of the first and second gemstone samples; and
  analyzing the images to determine the relationship between the first and second gemstone samples.

7. A method for determining a relationship between at least two gemstone samples, the method comprising:
  illuminating a first gemstone sample with illuminating light of at least one fluoresence-eiting wavelength range;
  detecting and recording a corresponding at least one first fluorescence-emission light spectrum emitted from the first gemstone sample;
  illuminating a second gemstone sample with the illuminating light of the at least one fluorescence-exciting wavelength range;
  detecting and recording a corresponding at least one second fluorescence-emission light spectrum emitted form the second gemstone sample;
  analyzing the at least one first fluorescence-emission spectrum and at least one second fluorescence-emission spectrum; and
  determining a relationship between the first and second gemstone samples;
wherein said determining the relationship between the first and second gemstone samples results in one of the following:
  determining that the first and second gemstone samples are the same gemstone in rough and polished states;
  determining that the first and second gemstone samples are two different gemstones in same rough, parted or polished state;
  determining that the first and second gemstone samples are two different gemstones in respectively two different states among the following: rough, parted and polished states.

8. A system for determining a relationship between first and second gemstone samples, the system comprising:
  a light source system comprising one or more light sources configured and operable to generate at least one illumination light in desired one or more wavelengths and intensities that excite at least one fluorescence reaction in the first and second gemstone samples;
  a holding stage configured to hold at least one of the first and second gemstone samples in illumination zone(s) covered by the at least one illumination light;
  a spectrometer located in a detection zone and configured and operable to detect at least one emission light emitted by each of the first and second gemstone samples and record corresponding at least one fluorescence-emission spectrum for each of the first and second gemstone samples; and
  a controller and analyzing system configured and operable to control the light source system, the holding stage, and the spectrometer, and analyze the at least one fluorescence-emission spectrum for each of the first and second gemstone samples, and determine a relationship between first and second gemstone samples;
wherein said controller and analyzing system comprises at least one of the following modules:
  a fluorescence-signature extractor module configured and operable to individually analyze the fluorescence-emission spectrum(s) received from each of the first and second gemstone samples and generate fluorescence-signatures respectively, then utilize the fluoresce-signatures to determine the relationship between the gemstone samples, and
  a fluorescence-comparison identifier extractor module configured and operable to apply a direct comparison between the fluorescence-emission spectrums that respectively belong to the first and second gemstone samples, and generate fluorescence comparison identifiers, then utilize the fluorescence comparison identifiers to determine the relationship between the first and second gemstone samples.

9. The system according to claim 8, wherein said light source system is configured and operable to generate the illuminating light of at least one fluorescence-exciting wavelength range in at least one of the following: UVA range, UVB range and UVC range.

10. The system according to claim 9, wherein said light source system is configured and operable to generate the illuminating light of at least one fluorescence-exciting wavelength range in at least one of the following wavelengths: 365 nm, 310 nm and 265 nm.

11. The system according to claim 8, further comprising a visible white light source configured and operable to illuminate through the first and second gemstone samples with visible white light; the spectrometer being configured and operable to record corresponding at least one absorbance spectrum for each of the first and second gemstone samples, the controller and analyzer system comprising at least one of the following modules:
   an absorbance-signature extractor module configured and operable to individually analyze the absorbance spectrums for the first and second gemstone samples and generate respective absorbance-signatures, then utilize the absorbance-signatures to determine the relationship between the first and second gemstone samples; and
   an absorbance-comparison identifier extractor module configured and operable to apply a direct comparison between the absorbance spectrums that respectively belong to the first and second gemstone samples and generate absorbance comparison identifiers, then utilize the absorbance comparison identifiers to determine the relationship between the first and second gemstone samples.

12. The system according to claim 8, further comprising an imaging system configured and operable to acquire images of the first and second gemstone samples, the controller and analyzing system being configured and operable to process the images and comprising at least one of the following:
   a three-dimensional (3D) model builder module configured and operable to generate 3D models of the first and second gemstone samples respectively, then utilize the 3D models to determine the relationship between the first and second gemstone samples;
   a fluorescence zone(s) identifier module configured and operable to detect fluorescence zone(s) in the first and second gemstone samples, while being illuminated with the at least one illumination light, and generate respective first and second fluorescence zone(s) map, then utilize the fluorescence zone(s) maps to determine the relationship between the first and second gemstone samples.

13. The system according to claim 8, wherein said controller and analyzing system is configured and operable to determine the relationship between the first and second gemstone samples by determining one of the following:
   that the first and second gemstone samples are the same gemstone in rough, parted, or polished states;
   that the first and second gemstone samples are two different gemstones in same rough, parted or polished state;
   that the first and second gemstone samples are two different gemstones in respectively two different states among the following: rough, parted and polished states.

14. The system according to claim 8, further comprising an excitation light directing system configured and operable to direct the at least one illumination light between the light source system and the first and second gemstone samples located in the illumination zone; wherein the excitation light directing system comprises an optical fiber directly coupled to each one of the one or more light sources.

15. The system according to claim 8, further comprising a light collecting system configured and operable to collect and direct the at least one emission light between the gemstone sample and the spectrometer; wherein the light collecting system comprises an optical fiber directly coupled to the spectrometer.

16. A system for determining properties of at least one gemstone sample, the system comprising:
   a light source system comprising one or more light sources configured and operable to generate illumination light in desired one or more wavelengths and intensities that excite at least one fluorescence reaction in the gemstone sample;
   a holding stage configured to hold the at least one gemstone sample in an illumination zone covered by the illumination light;
   a spectrometer located in a detection zone and configured and operable to detect at least one emission light emitted by the at least one gemstone sample and record corresponding at least one fluorescence-emission spectrum;
   an imaging system configured and operable to acquire images of the gemstone sample;
   and
   a controller and analyzing system configured and operable to control the light source system, the holding stage, and the spectrometer, and analyze at least two of the following: the at least one fluorescence-emission spectrum, and at least one of the at least one absorbance spectrum and the images, to determine the properties of the gemstone sample;
wherein the controller and analyzing system comprises at least one of the following modules:
   a fluorescence-signature extractor module configured and operable to analyze the at least one fluorescence-emission spectrum and generate at least one fluorescence-signature, then utilize the at least one fluorescence-signature to determine the properties of the gemstone sample;
   a three-dimensional (3D) model builder module configured and operable to generate a 3D model of the gemstone sample, then utilize the 3D model to determine the properties of the gemstone sample; and
   a fluorescence zone identifier module configure and operable to detect fluorescence zone(s) in the gemstone sample, while being illuminated with the at least one illumination light, and generate a fluorescence zone(s) map, then utilize the fluorescence zone(s) map to determine the properties of the gemstone sample.

17. The system according to claim 16, comprising a visible white light source configured and operable to illuminate through the gemstone sample with visible white light; the spectrometer being configured and operable to record corresponding at least one absorbance spectrum for the gemstone sample, said controller and analyzing system comprises:
   an absorbance-signature extractor module configured and operable to analyze the at least one absorbance spectrum and generate at least one absorbance-signature, then utilize the at least absorbance-signature to determine the properties of the gemstone sample.

* * * * *